(12) United States Patent
Konechne

(10) Patent No.: US 6,386,412 B1
(45) Date of Patent: May 14, 2002

(54) EXTENDED CAB STORAGE DEVICE

(76) Inventor: Ron Konechne, 5913 Coughran Ct., Sioux Falls, SD (US) 57106

(*) Notice: Subject to any disclaimer, the term of this patent is extended or adjusted under 35 U.S.C. 154(b) by 0 days.

(21) Appl. No.: 09/656,188

(22) Filed: Sep. 6, 2000

(51) Int. Cl.$^7$ ................................................ B60R 7/04
(52) U.S. Cl. ........................ 224/543; 224/275; 224/404; 296/37.16; D12/425; D12/426
(58) Field of Search .................................. 224/275, 543, 224/539, 542, 402, 404; 296/37.16, 37.6; D6/569, 570, 571; D12/425, 426, 423, 424

(56) References Cited

U.S. PATENT DOCUMENTS

| | | | |
|---|---|---|---|
| D158,115 S | * 4/1950 | Mell | D6/569 |
| 2,541,702 A | * 2/1951 | Katz | 224/539 |
| 2,934,374 A | * 4/1960 | Mortenson et al. | 224/539 |
| 3,249,382 A | * 5/1966 | Swithenbank | 224/402 |
| 3,946,678 A | 3/1976 | Birge, II et al. | |
| D249,671 S | 9/1978 | Vander Waal | |
| D249,672 S | 9/1978 | Vander Waal | |
| 4,230,358 A | 10/1980 | Legueu | |
| D286,330 S | * 10/1986 | Sussman | D6/671 |
| D293,866 S | * 1/1988 | Marsh | D6/570 |
| D299,186 S | * 1/1989 | Sills | D3/40 |
| 4,815,593 A | 3/1989 | Brown | |
| 4,832,193 A | 5/1989 | Kime | |
| 4,842,175 A | 6/1989 | Towsend | |
| 4,846,346 A | 7/1989 | Kime | |
| 4,892,346 A | * 1/1990 | Berlin | 296/37.6 |
| 5,269,599 A | 12/1993 | Moring | |
| 5,387,064 A | 2/1995 | Cardinal | |
| 5,524,951 A | * 6/1996 | Johnson | 296/37.6 |
| D376,578 S | * 12/1996 | Redford | D12/424 |
| 5,605,389 A | * 2/1997 | Kelly et al. | 312/258 |
| 5,667,115 A | 9/1997 | Verhaug | |
| 5,725,037 A | 3/1998 | Falhaber | |
| 5,829,655 A | 11/1998 | Salopek | |
| 5,855,310 A | * 1/1999 | Van Ert | 224/543 |
| 5,951,084 A | * 9/1999 | Okazaki | 296/37.16 |
| 5,957,287 A | 9/1999 | Valenti et al. | |

* cited by examiner

*Primary Examiner*—Stephen P. Garbe

(57) ABSTRACT

An extended cab storage device for storing items behind the front seat of an extended cab pickup truck. The extended cab storage device includes a housing comprising a bottom wall, a top wall, and a pair of lateral side walls. Each of the lateral side walls extends below a plane of a bottom surface of the bottom wall. An intermediate horizontal wall generally extends between and is securely coupled to the lateral side walls. The intermediate horizontal wall is generally spaced from the top and bottom walls. Each of the lateral side walls has at least one window extending therethrough.

20 Claims, 6 Drawing Sheets

EXTENDED CAB STORAGE DEVICE

BACKGROUND OF THE INVENTION

1. Field of the Invention

The present invention relates to storage devices and more particularly pertains to a new extended cab storage device for storing items behind the front seat of an extended cab pickup truck.

2. Description of the Prior Art

The use of storage devices is known in the prior art. More specifically, storage devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,842,175; U.S. Pat. No. 4,230,358; U.S. Pat. No. 5,829,655; U.S. Pat. No. 3,946,678; U.S. Pat. No. 5,957,287; U.S. Pat. No. 5,387,064; U.S. Pat. No. 4,815,593; U.S. Pat. No. 4,832,193; U,S, Pat. No. 5,269,599; U.S. Pat. No. 4,846,346; U.S. Pat. No. 5,677,115; U.S. Pat. No. 5,725,037; U.S. Des. Pat. No. 249,671; and U.S. Des. Pat. No. 249,672.

While these devices fulfill their respective, particular objectives and requirements, the aforementioned patents do not disclose a new extended cab storage device. The inventive device includes a housing comprising a bottom wall, a top wall, and a pair of lateral side walls. Each of the lateral side walls extends below a plane of a bottom surface of the bottom wall. An intermediate horizontal wall generally extends between and is securely coupled to the lateral side walls. The intermediate horizontal wall is generally spaced from the top and bottom walls. Each of the lateral side walls has at least one window extending therethrough.

In these respects, the extended cab storage device according to the present invention substantially departs from the conventional concepts and designs of the prior art, and in so doing provides an apparatus primarily developed for the purpose of storing items behind the front seat of an extended cab pickup truck.

SUMMARY OF THE INVENTION

In view of the foregoing disadvantages inherent in the known types of storage devices now present in the prior art, the present invention provides a new extended cab storage device construction wherein the same can be utilized for storing items behind the front seat of an extended cab pickup truck.

The general purpose of the present invention, which will be described subsequently in greater detail, is to provide a new extended cab storage device apparatus and method which has many of the advantages of the storage devices mentioned heretofore and many novel features that result in a new extended cab storage device which is not anticipated, rendered obvious, suggested, or even implied by any of the prior art storage devices, either alone or in any combination thereof.

To attain this, the present invention generally comprises a housing comprising a bottom wall, a top wall, and a pair of lateral side walls. Each of the lateral side walls extends below a plane of a bottom surface of the bottom wall. An intermediate horizontal wall generally extends between and is securely coupled to the lateral side walls. The intermediate horizontal wall is generally spaced from the top and bottom walls. Each of the lateral side walls has at least one window extending therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new extended cab storage device apparatus and method which has many of the advantages of the storage devices mentioned heretofore and many novel features that result in a new extended cab storage device which is not anticipated, rendered obvious, suggested, or even implied by any of the prior art storage devices, either alone or in any combination thereof.

It is another object of the present invention to provide a new extended cab storage device which may be easily and efficiently manufactured and marketed.

It is a further object of the present invention to provide a new extended cab storage device which is of a durable and reliable construction.

An even further object of the present invention is to provide a new extended cab storage device which is susceptible of a low cost of manufacture with regard to both materials and labor, and which accordingly is then susceptible of low prices of sale to the consuming public, thereby making such extended cab storage device economically available to the buying public.

Still yet another object of the present invention is to provide a new extended cab storage device which provides in the apparatuses and methods of the prior art some of the advantages thereof, while simultaneously overcoming some of the disadvantages normally associated therewith.

Still another object of the present invention is to provide a new extended cab storage device for storing items behind the front seat of an extended cab pickup truck.

Yet another object of the present invention is to provide a new extended cab storage device which includes a housing comprising a bottom wall, a top wall, and a pair of lateral side walls. Each of the lateral side walls extends below a plane of a bottom surface of the bottom wall. An intermediate horizontal wall generally extends between and is securely coupled to the lateral side walls. The intermediate horizontal wall is generally spaced from the top and bottom walls. Each of the lateral side walls has at least one window extending therethrough.

Still yet another object of the present invention is to provide a new extended cab storage device that is retrofittable in existing pickup trucks.

Even still another object of the present invention is to provide a new extended cab storage device that efficiently stores a variety of different accessories while offering easy accessibility.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
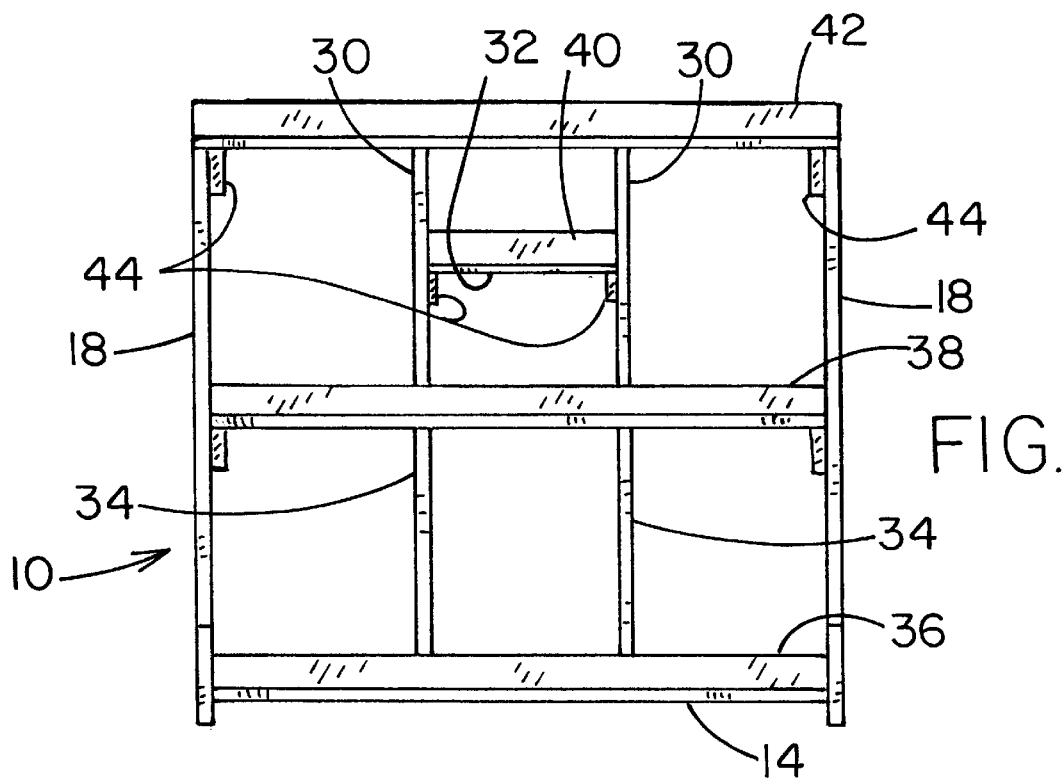
FIG. 1 is a schematic front view of a new extended cab storage device according to the present invention.
Figure 2:
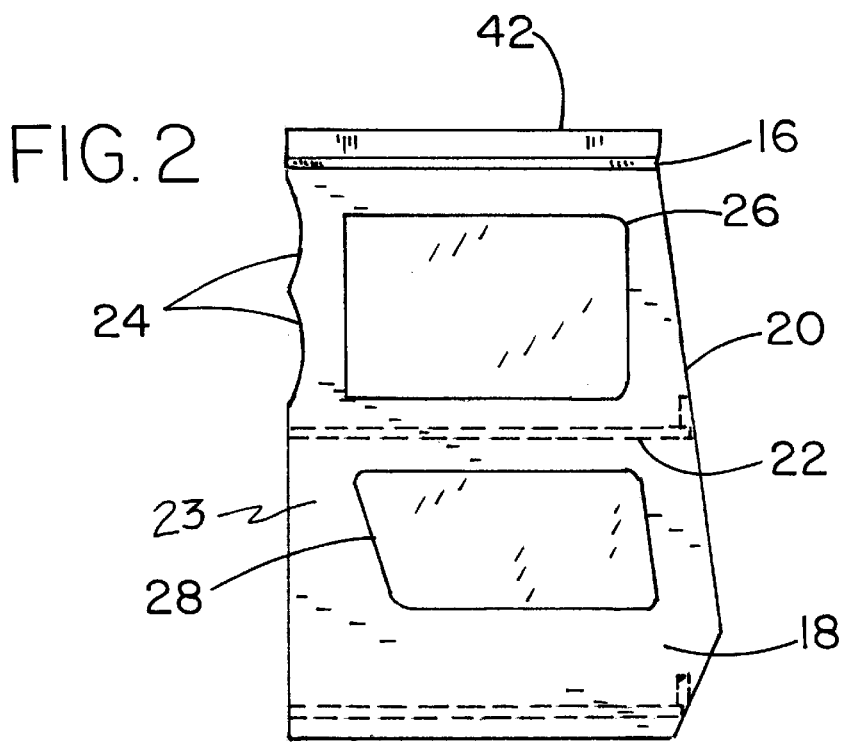
FIG. 2 is a schematic side view of the present invention.
Figure 3:
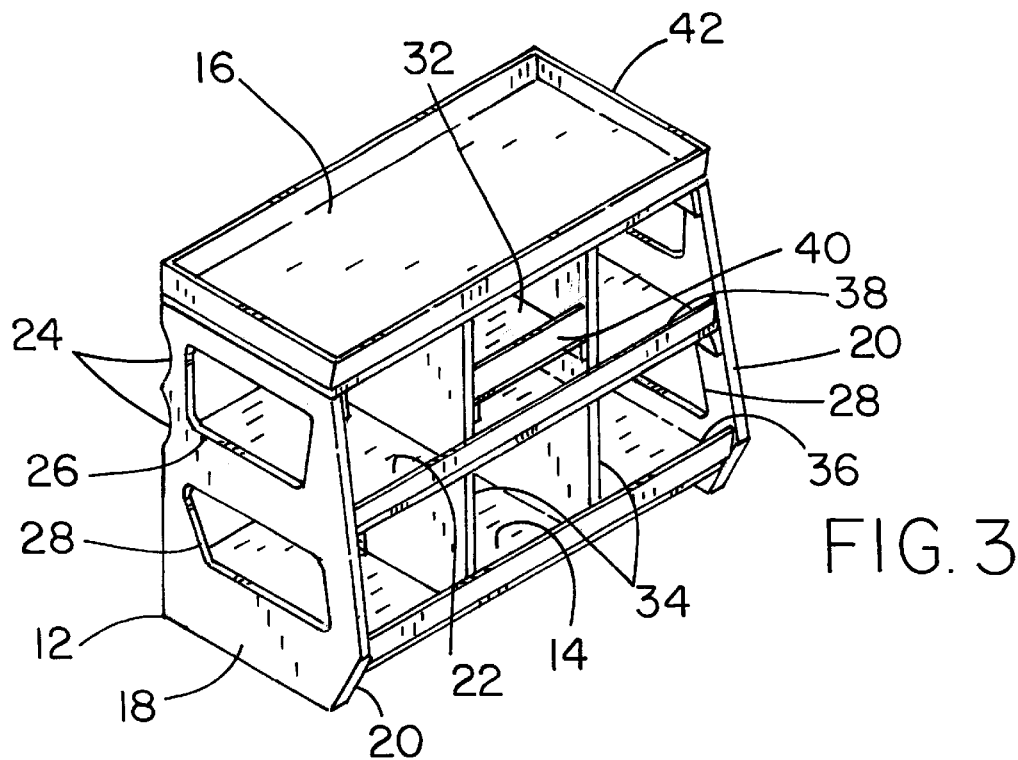
FIG. 3 is a schematic perspective view of the present invention.
Figure 4:
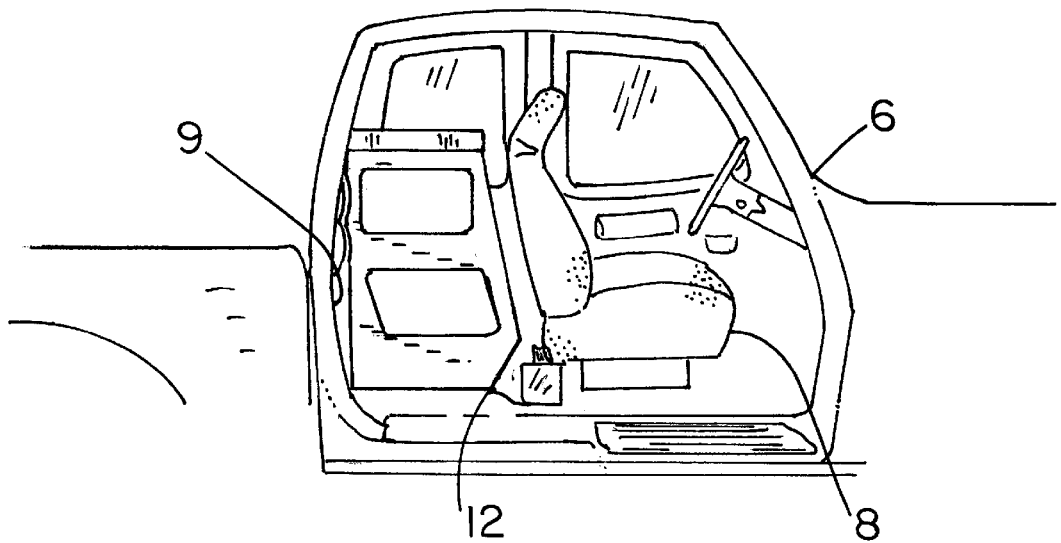
FIG. 4 is a schematic side view of the present invention.
Figure 5:
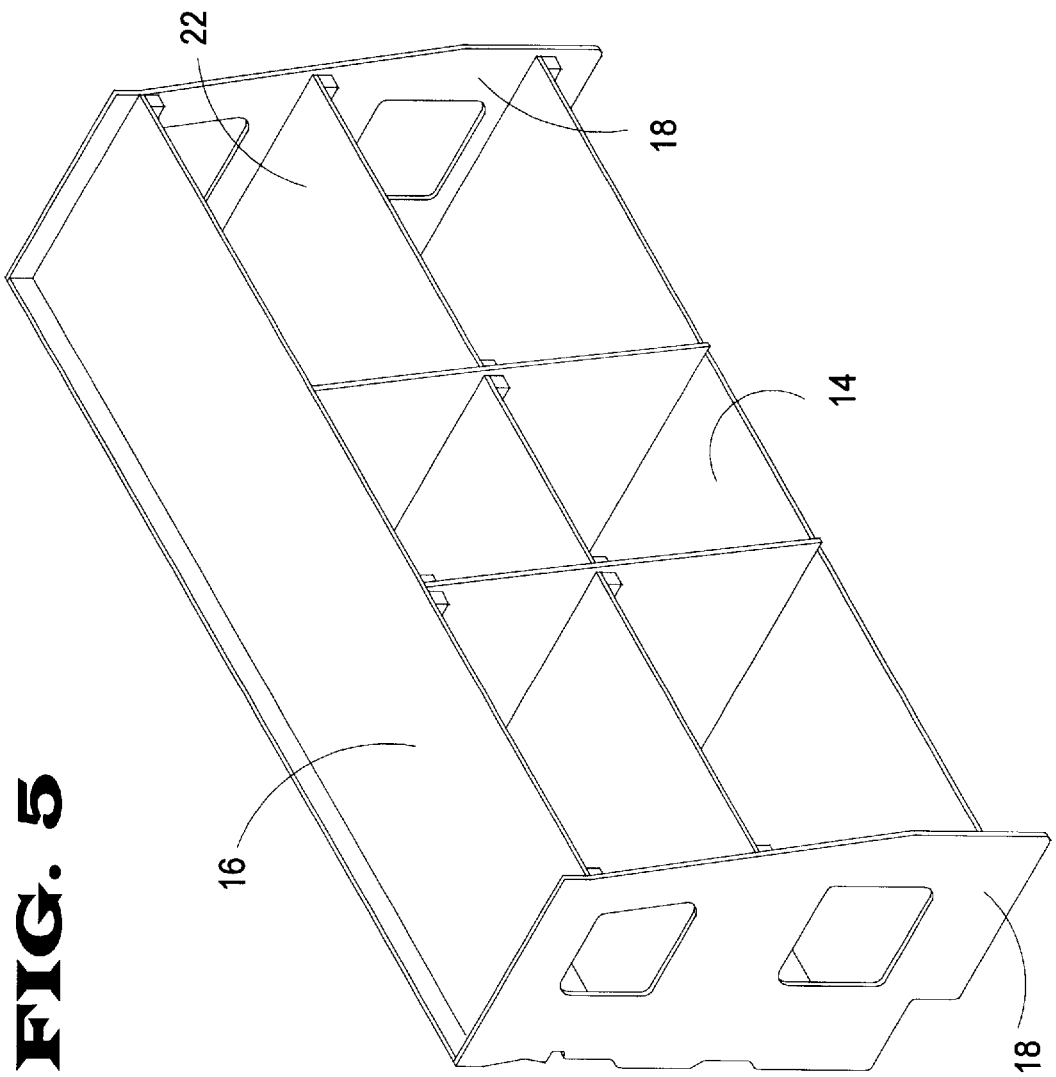
FIG. 5 is a schematic perspective view of an optional configuration of the present invention.
Figure 6:
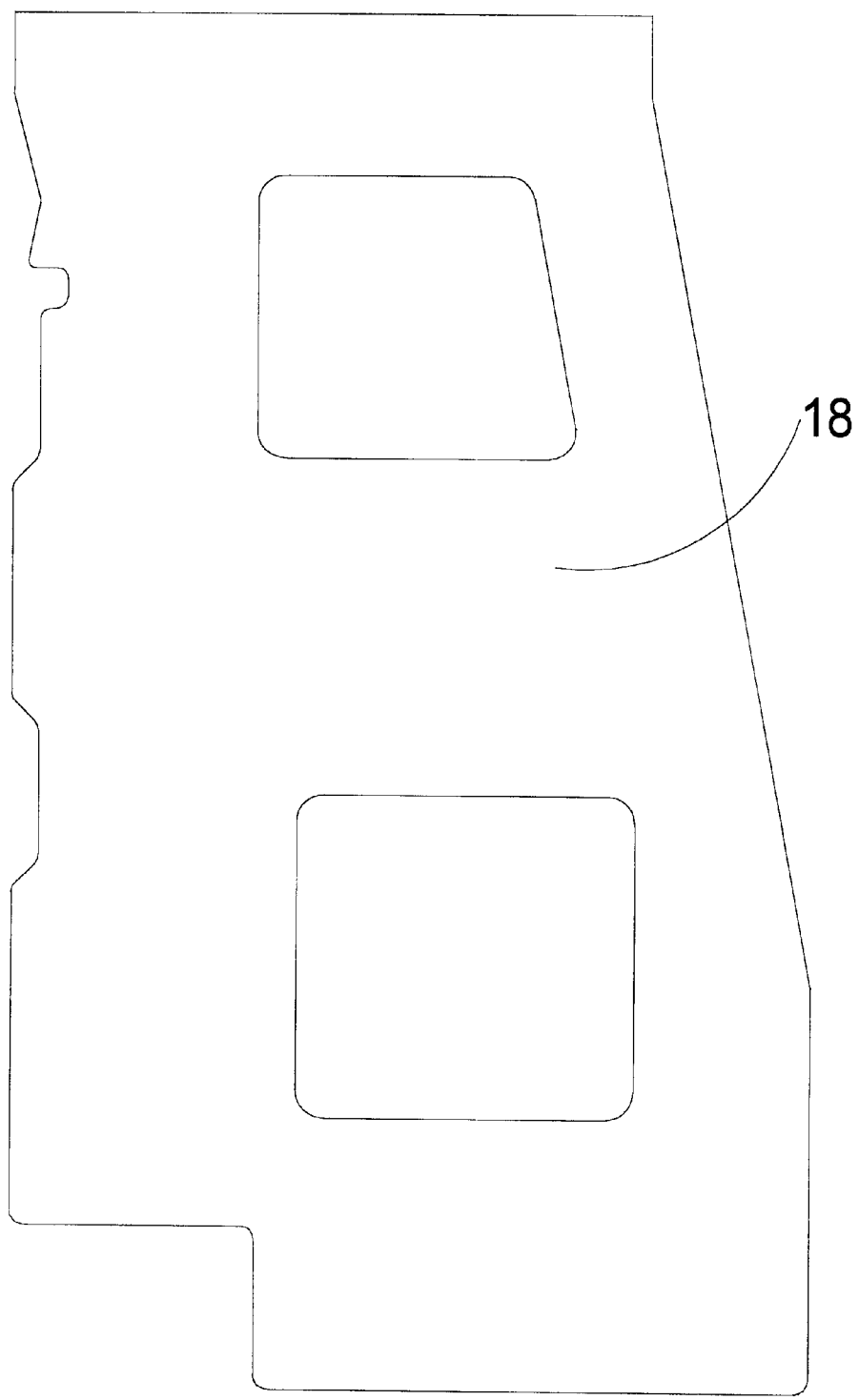
FIG. 6 is a schematic side view of the optional configuration of the present invention shown in FIG. 5.
Figure 7:
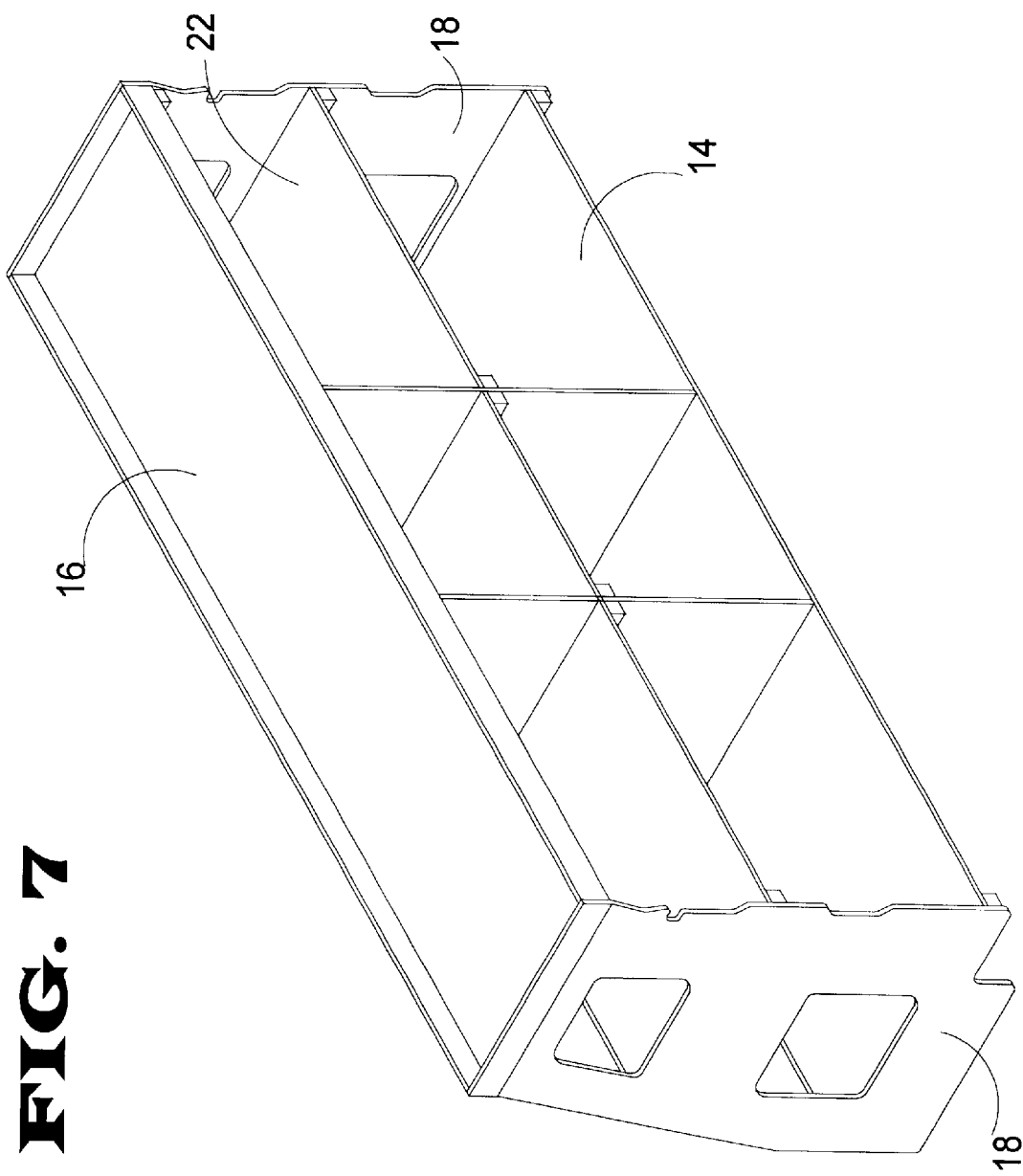
FIG. 7 is a schematic rear perspective view of another optional configuration of the present invention.
Figure 8:
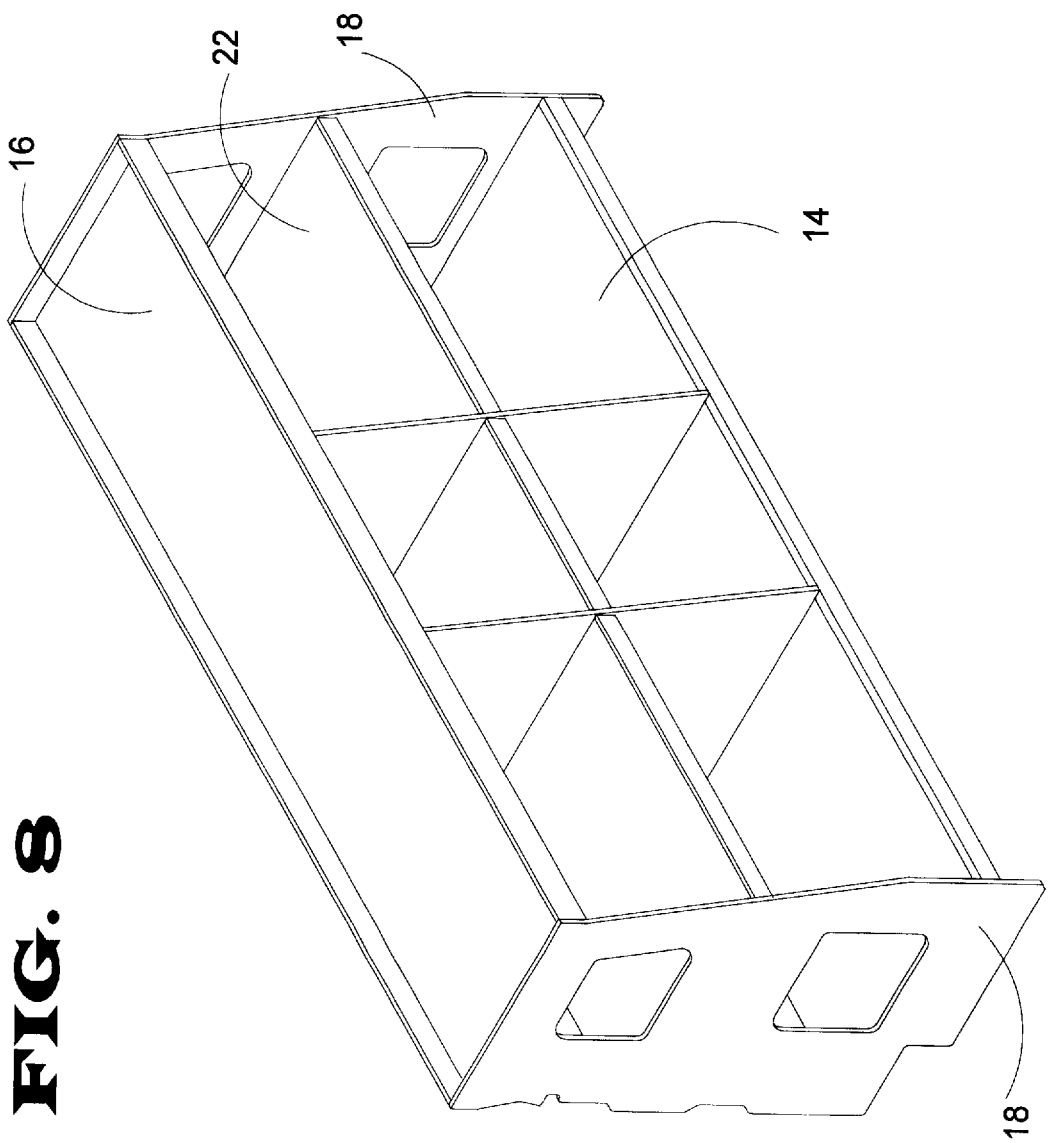
FIG. 8 is a schematic front perspective view of the optional configuration of the present invention shown in FIG. 7.

With reference now to the drawings, and in particular to FIGS. 1 through 8 thereof, a new extended cab storage device embodying the principles and concepts of the present invention and generally designated by the reference numeral 10 will be described.

As best illustrated in FIGS. 1 through 4, the extended cab storage device 10 generally comprises a housing 12. The housing 12 includes a bottom wall 14, a top wall 16, and a pair of lateral side walls 18. Each of the lateral side walls 18 preferably extend below a plane of a bottom surface of the bottom wall 14 by a length of one to three inches. Each of the lateral side walls 18 has a front edge 20. Each of the front edges 20 angles outwardly as each of the front edges 20 travels downwardly from the top wall 16 to the bottom wall 14. Each of the front edges 20 angle inwardly as each of the front edges 20 travels downwardly from a point generally nearer the bottom wall 14 than the top wall 16 to a point generally adjacent to the bottom wall 14. This allows a better fitting behind the front seat 8 of an extended cab pickup truck 6 as the front seat 8 tilts backward.

An intermediate horizontal wall 22 generally extends between and is securely coupled to the lateral side walls 18. The intermediate horizontal wall 22 is generally spaced from the top and botton walls. Each of the lateral side walls 18 has a back edge 23 having a pair of arcuate grooves 24 therein positioned generally between the intermediate horizontal wall 22 and the top wall 16. The arcuate grooves 24 allows positioning against bars which are typically found on the inside surface of the back wall 9 of the cab. The bars are positioned in the grooves 24 so that the device is pushed further back.

Each of the lateral side walls 18 has a first window 26 and a second window 28 extending therethrough. The first window 26 is positioned between the top wall 16 and the intermediate horizontal wall 22. The second window 28 is positioned between the bottom wall 14 and the intermediate horizontal wall 22. The windows allow for access to the compartments of the device 10 through the lateral side walls 18.

Each pair of upper intermediate walls 30 extends between and is securely coupled to the top wall 16 and the intermediate horizontal wall 22. Each of the upper intermediate walls 30 is generally spaced from each other and orientated generally parallel to the lateral side walls 18. Each of the upper intermediate walls has a back edge having a pair of arcuate grooves therein for the reasons specified above.

A panel 32 extends between and is securely attached to the upper intermediate walls 30. The panel 32 is orientated generally parallel to and is spaced between the intermediate horizontal wall 22 and the top wall 16. The panel 32 defines a shelf.

Each of a pair of lower intermediate walls 34 extends between and is securely coupled to the bottom wall 14 and the intermediate horizontal wall 22. Each of the lower intermediate walls 34 is generally spaced from each other and orientated generally parallel to the lateral side walls 18. It is noted that a plurality of both vertical and horizontal intermediate walls is envisioned.

A first lip 36 is securely coupled to and extends upwardly from a front edge of the bottom wall 14. The first lip 36 extends between the lateral side walls 18.

A second lip 38 is securely coupled to and extends upwardly from a front edge of the intermediate horizontal wall 22. The second lip 38 extends between the lateral side walls 18.

A third lip 40 is securely coupled to and extends upwardly from a front edge of the panel 32. The third lip 40 extends between the upper intermediate walls 30.

A peripheral lip 42 is securely attached to and extends upwardly from a peripheral edge of the top wall 16. The lips help to hold items within the device 10.

Additionally, supports 44 may be added to each shelf for reinforcing the strength of the device 10. The device 10 preferably has a height between 3 feet and 4 feet, a width between 2 feet and 3 feet, and a length between 4 feet and 5 feet.

FIGS. 5 through 8 illustate optional configurations of the invention.

In use, the device is positioned behind the front seat of a pickup truck in having an extended cab. The device is primarily of use to those in the utility or construction industries who need access to wide variety of tools and items while being able to lock such within the vehicle. The device is retrofittable to trucks currently used in the industry.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage container device for removable placement behind the seat of an extended cab pick-up truck, said device comprising:
   a housing comprising a bottom wall, a top wall, and a pair of lateral side walls, each of said lateral side walls extending below a plane of a bottom surface of said bottom wall;
   an intermediate horizontal wall extending between and being securely coupled to said lateral side walls, said intermediate horizontal wall being generally spaced from said top and bottom walls;
   each of said lateral side walls having a back edge having at least one arcuate groove therein positioned generally between said intermediate horizontal wall and said top wall
   a pair of upper intermediate walls, each of said upper intermediate walls extending between and securely coupled to said top wall and said intermediate horizontal wall, each of said upper intermediate walls being generally spaced from each other and orientated generally parallel to said lateral side walls, each of said upper intermediate walls having a back edge having a pair of arcuate grooves therein; and
   each of said lateral side walls having at least one window extending therethrough.

2. The storage container device as in claim 1, wherein each of said lateral side walls has a front edge, each of said front edges angling outwardly as each of said front edges travels downwardly from said top wall to said bottom wall.

3. The storage container device as in claim 2, wherein each of said front edges angles inwardly as each of said front edges travels downwardly from a point generally nearer said bottom wall than said top wall to a point generally adjacent to said bottom wall.

4. The storage container device as in claim 1, wherein each of said lateral side walls has a first window and a second window extending therethrough, said first window being positioned between said top wall and said intermediate horizontal wall, said second window being positioned between said bottom wall and said intermediate horizontal wall.

5. The storage container device as in claim 1, further including a pair of upper intermediate walls, each of said upper intermediate walls extending between and securely coupled to said top wall and said intermediate horizontal wall, each of said upper intermediate walls being generally spaced from each other and orientated generally parallel to said lateral side walls.

6. The storage container device as in claim 5, further including a panel extending between and being securely attached to said upper intermediate walls, said panel being orientated generally parallel to and being spaced between said intermediate horizontal wall and said top wall.

7. The storage container device as in claim 6, further including a pair of lower intermediate walls, each of said lower intermediate walls extending between and securely coupled to said bottom wall and said intermediate horizontal wall, each of said lower intermediate walls being generally spaced from each other and orientated generally parallel to said lateral side walls.

8. The storage container device as in claim 1, further including a panel extending between and being securely attached to said upper intermediate walls, said panel being orientated generally parallel to and being spaced between said intermediate horizontal wall and said top wall.

9. The storage container device as in claim 8, further comprising a pair of lower intermediate walls, each of said lower intermediate walls extending between and securely coupled to said bottom wall and said intermediate horizontal wall, each of said lower intermediate walls being generally spaced from each other and orientated generally parallel to said lateral side walls.

10. The storage container device as in claim 1, further including a pair of lower intermediate walls, each of said lower intermediate walls extending between and securely coupled to said bottom wall and said intermediate horizontal wall, each of said lower intermediate walls being generally spaced from each other and orientated generally parallel to said lateral side walls.

11. The storage container device as in claim 1, further comprising a first lip being securely coupled to and extending upwardly from a front edge of said bottom wall, said first lip extending between said lateral side walls.

12. The storage container device as in claim 1, further comprising a first lip being securely coupled to and extending upwardly from a front edge of said bottom wall, said first lip extending between said lateral side walls.

13. The storage container device as in claim 12, further comprising a second lip being securely coupled to and extending upwardly from a front edge of said intermediate horizontal wall, said second lip extending between said lateral side walls.

14. The storage container device as in claim 13, further comprising a peripheral lip being securely attached to and extending upwardly from a peripheral edge of said top wall.

15. The storage container device as in claim 1, further comprising a peripheral lip being securely attached to and extending upwardly from a peripheral edge of said top wall.

16. A storage container device for removable placement behind the seat of an extended cab pick-up truck, said device comprising:
   a housing comprising a bottom wall, a top wall, and a pair of lateral side walls, each of said lateral side walls extending below a plane of a bottom surface of said bottom wall, each of said lateral side walls having a front edge, each of said front edges angling outwardly as each of said front edges travels downwardly from said top wall to said bottom wall, each of said front edges angling inwardly as each of said front edges travels downwardly from a point generally nearer said bottom wall than said top wall to a point generally adjacent to said bottom wall;

an intermediate horizontal wall extending between and being securely coupled to said lateral side walls, said intermediate horizontal wall being generally spaced from said top and bottom walls, each of said lateral side walls having a back edge having a pair of arcuate grooves therein positioned generally between said intermediate horizontal wall and said top wall;

each of said lateral side walls having a first window and a second window extending therethrough, said first window being positioned between said top wall and said intermediate horizontal wall, said second window being positioned between said bottom wall and said intermediate horizontal wall;

a pair of upper intermediate walls, each of said upper intermediate walls extending between and securely coupled to said top wall and said intermediate horizontal wall, each of said upper intermediate walls being spaced from each other and orientated generally parallel to said lateral side walls, each of said upper intermediate walls having a back edge having a pair of arcuate grooves therein;

a panel extending between and being securely attached to said upper intermediate walls, said panel being orientated generally parallel to and being spaced between said intermediate horizontal wall and said top wall;

a pair of lower intermediate walls, each of said lower intermediate walls extending between and securely coupled to said bottom wall and said intermediate horizontal wall, each of said lower intermediate walls being spaced from each other and orientated generally parallel to said lateral side walls;

a first lip being securely coupled to and extending upwardly from a front edge of said bottom wall, said first lip extending between said lateral side walls;

a second lip being securely coupled to and extending upwardly from a front edge of said intermediate horizontal wall, said second lip extending between said lateral side walls;

a third lip being securely coupled to and extending upwardly from a front edge of said panel, said third lip extending between said upper intermediate walls; and a peripheral lip being securely attached to and extending upwardly from a peripheral edge of said top wall.

17. A storage container device for removable placement behind the seat of an extended cab pick-up truck, said device comprising:

a housing comprising a bottom wall, a top wall, and a pair of lateral side walls, each of said lateral side walls extending below a plane of a bottom surface of said bottom wall, each of said lateral side walls having at least one window extending therethrough;

an intermediate horizontal wall extending between and being securely coupled to said lateral side walls, said intermediate horizontal wall being generally spaced from said top and bottom walls; and a pair of upper intermediate walls, each of said upper intermediate walls extending between and securely coupled to said top wall and said intermediate horizontal wall, each of said upper intermediate walls being generally spaced from each other and orientated generally parallel to said lateral side walls.

18. The storage container device as in claim 17, wherein each of said lateral side walls has a back edge having at least one annular groove therein positioned generally between said intermediate horizontal wall and said top wall, each of said upper intermediate walls having a back edge having at least one annular groove therein.

19. The storage container device as in claim 17, wherein each of said lateral side walls has a first window and a second window extending therethrough, said first window being positioned between said top wall and said intermediate horizontal wall, said second window being positioned between said bottom wall and said intermediate horizontal wall.

20. A storage container device for removable placement behind the seat of an extended cab pick-up truck, said device comprising:

a housing comprising a bottom wall, a top wall, and a pair of lateral side walls, each of said lateral side walls extending below a plane of a bottom surface of said bottom wall;

an intermediate horizontal wall extending between and being securely coupled to said lateral side walls, said intermediate horizontal wall being generally spaced from said top and bottom walls; and a pair of lower intermediate walls, each of said lower intermediate walls extending between and being securely coupled to said bottom wall and said intermediate horizontal wall, each of said lower intermediate walls being generally spaced from each other and orientated generally parallel to said lateral side walls.

* * * * *